(12) United States Patent
Jackson

(10) Patent No.: US 6,979,362 B2
(45) Date of Patent: Dec. 27, 2005

(54) APPARATUS AND PROCESS FOR THE TREATMENT, DELIVERY AND RECYCLE OF PROCESS FLUIDS USED IN DENSE PHASE CARBON DIOXIDE APPLICATIONS

(76) Inventor: David P. Jackson, 22328 W. Barcotta Dr., Saugus, CA (US) 91350

( * ) Notice: Subject to any disclaimer, the term of this patent is extended or adjusted under 35 U.S.C. 154(b) by 30 days.

(21) Appl. No.: 10/476,108

(22) PCT Filed: Apr. 24, 2002

(86) PCT No.: PCT/US02/13201
§ 371 (c)(1),
(2), (4) Date: Oct. 24, 2003

(87) PCT Pub. No.: WO02/085528
PCT Pub. Date: Oct. 31, 2002

(65) Prior Publication Data
US 2004/0131516 A1 Jul. 8, 2004

Related U.S. Application Data
(60) Provisional application No. 60/286,103, filed on Apr. 24, 2001.

(51) Int. Cl.$^7$ .............................................. B01D 19/00
(52) U.S. Cl. ............................. 96/218; 95/257; 55/315; 55/315.2
(58) Field of Search .................... 96/155, 218; 95/241, 95/251, 254, 256, 257; 55/315, 315.2, 319; 62/48.1, 50.5; 422/198; 239/135, 406, 417, 429, 525

(56) References Cited

U.S. PATENT DOCUMENTS

| | | | | |
|---|---|---|---|---|
| 2,325,045 A | * | 7/1943 | Dennis | 62/48.1 |
| 4,787,404 A | * | 11/1988 | Klosterman et al. | 134/198 |
| 5,706,842 A | * | 1/1998 | Caimi et al. | 134/113 |
| 5,725,154 A | * | 3/1998 | Jackson | 239/135 |
| 5,730,806 A | * | 3/1998 | Caimi et al. | 134/22.12 |
| 5,918,817 A | * | 7/1999 | Kanno et al. | 239/433 |

* cited by examiner

*Primary Examiner*—Robert A. Hopkins
(74) *Attorney, Agent, or Firm*—Jeffrey F. Craft; Paul D. Chancellor (57) ABSTRACT

The present invention relates generally to providing an apparatus for on-site $CO_2$ process fluids management. A standardized and universal platform is described which provides $CO_2$ process fluids at various capacities, purity levels, pressures, temperatures and phases. Moreover, herein is described an apparatus and process for communicating with factory cleaning and automation tools. Finally, the present invention describes novel apparatus and method for treating gas or liquid phase carbon dioxide using a photo-initiated catalytic reaction, a novel self-cooling and self-regenerating bulk phase recycling system for liquid phase carbon dioxide, and a novel quality control technique using on-line fiber optic spectroscopic analysis.

1 Claim, 9 Drawing Sheets

APPARATUS AND PROCESS FOR THE TREATMENT, DELIVERY AND RECYCLE OF PROCESS FLUIDS USED IN DENSE PHASE CARBON DIOXIDE APPLICATIONS

This application is a 371 of PCT/US02/13201, filed Apr. 24, 2002, which claims benefit of U.S. Provisional No. 60/286,103, filed Apr. 24, 2001.

BACKGROUND OF THE INVENTION

The present invention relates in general to the treatment and management of process fluids used in Dense Phase $CO_2$ applications. More specifically, the present invention relates to an apparatus and process for treating, blending, delivering and recycling $CO_2$ as well as providing clean inert purging or propellant gas for cleaning and extraction systems utilizing solid, liquid and supercritical phase carbon dioxide.

The $CO_2$ cleaning technology developed by the present inventor, and described in detail under issued and pending patents, requires unique process fluid supply requirements not found in conventional $CO_2$ cleaning technology. For example, the TIG-Snow cleaning process described in U.S. Pat. No. 5,725,154, Jackson, teaches the use of both a gas and liquid to produce a cleaning snow (liquid phase) and a propellant (gas phase). Propellant gases may include nitrogen, carbon dioxide or clean-dry-air, among others, and come from a variety of cylinder sources and pressures. The liquid used in the aforementioned invention is liquid carbon dioxide stored under pressure and come in two forms—300 psi and 0F (Vacuum Dewar) and 832 psi and 70F (High Pressure Cylinder). Depending upon the type of cleaning application, various qualities of process fluids may be required to prevent the transfer of contaminants contained within the supply onto critical surfaces during $CO_2$ spray cleaning operations. Contaminants typically found in $CO_2$ and other gaseous process fluid supplies include trace hydrocarbons, silicones, particles and water vapor. Moreover, liquid and supercritical fluid $CO_2$ systems developed and patented by the present inventor require chemical additive, pressure, temperature and, recovery requirements which are very different from those of solid phase carbon dioxide cleaning systems. Moreover, common to most $CO_2$ cleaning processes, regardless of phase used, is a requirement for ultraclean pure process gas for purging, drying and inerting operations.

The conventional approach to providing pure $CO_2$ process fluids is characterized by patchwork and customization. For example, $CO_2$ cleaning processes can be supplied with pure cylinder gases and liquids. Cylinders containing ultra-pure process fluids are available from most large industrial gas supply companies such as Praxair and BOC. These types of fluid supplies may cost between $1.50 and $15.00 (U.S.) per pound delivered. Moreover, bulk supplies of ultrapure process fluids with thermal catalytic treatment units and pumps may be installed but are expensive and do not communicate with or supply all the necessary process fluids in the proper pressure, state and temperature. The cost to deliver this quality of process fluid supply in bulk form makes the $CO_2$ cleaning process prohibitively expensive—especially without recycling and recovery capability.

For example, one such commercial $CO_2$ purification system is offered by Va-Tran Systems, Chula Vista, Calif., which employs a refrigerant-based vapor condenser system. The system may be coupled with a thermal catalytic treatment unit upstream prior to vapor condenser unit to deliver a purified liquid $CO_2$ product. Problems observed by the present inventor and end-users of this type of purifier when used with aforementioned snow cleaning equipment developed by the present inventor include erratic pressure and temperature regulation of the purified process fluid delivered to the cleaning system. Pressure, temperature and delivery control problems become more severe when using the Va-Tran purifier with low-pressure carbon dioxide supplies such as a bulk 300 psi and 0 F tank. Moreover, the Va-Tran system attempts to resolve only one component of a multi-component process fluid management problem, namely chemical quality. However, in this regard, the Va-Tran approach is incomplete—lacking chemical treatment technology for water vapor, fine particles and volatile hydrocarbons.

In another example, commercial liquid and supercritical carbon dioxide cleaning systems require larger capacities and qualities which cannot be achieved using a commercial purifier such as that offered by Va-Tran. Features not provided include blending of additives, recycling and recovery of spent process fluids. Commercial suppliers of liquid and carbon dioxide cleaning systems typical integrate a custom carbon dioxide recovery system into the cleaning system. Air Liquide offers the COSOLV™ supercritical fluid delivery platform for these types of applications, but does not provide for recovery and recycling of the spent process fluids.

A lack of communication with $CO_2$ applications equipment is another limiting factor. Supply side parameters such as supply volume, delivery capacity and quality, also requires endusers to resort to patchwork and customization to develop a basic process fluids management system for their particular applications equipment. End-users invariably resort to purchasing and patching together independent supply, purification and delivery systems as well as electronic control means to meet all of their process fluid delivery requirements—capacity, purity, phase conditions and control.

Moreover, conventional $CO_2$ process fluids treatment and recycling designs are not energy efficient and require a large footprint for implementation. Typical $CO_2$ recycling systems utilize separate distillation and recovery tanks with separate heating and cooling devices. Vapor treatment technology such as thermal catalytic units introduce significant amounts of heat into the vapor phase during treatment, which requires additional system cooling following treatment and prior to fluidization.

In summary, commercial systems lack integration and standardization—therefore the various carbon dioxide cleaning technology vendors each develop a specific treatment, delivery and recycling platform for their specific $CO_2$ equipment and/or the industrial gas supply companies deliver expensive ultrapure cylinder gases or even a custom on-site treatment unit without a recovery system. Moreover, none of the aforementioned conventional $CO_2$ treatment systems provide for multimedia treatment, delivery and recycling capability. Still moreover, energy efficiency and space utilization are not optimized in conventional technologies.

As such, there is a present need for an on-site standardized and modular $CO_2$ process fluids management platform which provides $CO_2$ process fluids, at various capacities, purity levels, pressures, temperatures and phases. This is particularly true for technology developed by the present inventor, namely coaxial $CO_2$ spray and centrifugal $CO_2$ cleaning technology. However, as can be seen from the above discussion, these same capabilities are needed for other more conventional $CO_2$ cleaning system designs. Moreover, there is a need for a $CO_2$ process fluids management system that can integrate and communicate with $CO_2$ cleaning and assembly equipment using a standard communication platform. Finally, there is a present need for a fluids management system that can blend additives into $CO_2$ process fluids and recover and recycle spent process fluids following end-use applications and is compact and energy-efficient.

SUMMARY OF THE INVENTION

The present invention overcomes the deficiencies of prior art purification, delivery and recycling systems and methodologies. The present invention provides a universal cleaning process fluids management system, which can be connected to any type of supply and pressure of carbon dioxide gas (bulk, mini-bulk or cylinder) and compressed air supply ranging from 150 psi to 850 psi. The present invention produces and delivers clean dry air or gas for purging and as propellant, and clean liquid or supercritical carbon dioxide as a cleaning agent—a multi-media treatment and delivery system.

The present invention teaches a gas cabinet design housing the fluid treatment trains, PC/PLC controller, and various inlet and outlet ports for carbon dioxide, air or other specified gases as well as waste management. The front panel of the gas cabinet features controls for main power, emergency stop and a graphical user interface to communicate visually and electronically process fluid conditions such as pressure, temperature and level. The gas cabinet features a top-mounted process indicating stack light, a machine communication interface port, an internal IR $CO_2$ leak detector and optional on-line spectroscopic fluids analysis.

The present invention is a scaleable fluids purification and management configuration to meet the quality, phase and capacity requirements of any $CO_2$ cleaning-assembly application. The present invention can produce, package and deliver high quality pure or blended carbon dioxide, and laboratory grade gas or propellant for use in a variety of industrial processes and equipment utilizing gaseous, solid, liquefied or supercritical $CO_2$. The present invention is an intelligent fluids management system. A PC or PLC-controlled system design provides automatic and consistent generation and delivery of high quality or blended carbon dioxide to (and from) a particular $CO_2$-enabled device. The present invention has communications capability, which alerts a clean-assembly tool control system to fluids management conditions such as level, pressure, phase, temperature and supply volume. A central equalization tank design with a built-in change-over supply system provides buffer capacity necessary to adjust out-of-spec fluid conditions or to stop a clean-assembly machine for system performance corrections. Moreover, the present invention may be integrated into factory Ethernet or internet communication systems.

Although the present invention has been designed to integrate and communicate with solid, liquid and supercritical cleaning systems developed by the present inventor, especially integrated cleaning-assembly tools, it may be used as a universal treatment and delivery platform for most commercially available $CO_2$ cleaning products.

Moreover, various safety, operational control and communication, and real-time quality control (analysis) components have been integrated into the design to produce a fully-automatic and safe treatment and delivery system. The present invention is designed with various treatment configurations ("Treatment Trains") employing state-of-the-art conventional as well as new fluid purification technology. These include 1) Low-Temperature Distillation, 2) Selective Membrane Separation, 3) Catalytic Destruction and 4) $CO_2$ Recovery and Recycling. The purpose of treatment trains is to produce a particular process fluid for degreasing, particle removal, pH control, high-quality beverage carbonation, or extraction, among other $CO_2$ requirements. The invention disclosed herein has a treatment capacity ranging from 18 to 500 pounds per hour and $CO_2$ purity levels of up to 99.999999%.

The present invention is designed to be used with any type of commercial $CO_2$ supply (i.e., high-pressure cylinders, and low-pressure mini-bulk or bulk supplies) and chemical quality (i.e., welding and beverage carbonation grades). If blending and recycling are required, an additive injection and recovery system is integrated into the design. The present invention will produce a variety of pressures, temperatures, phases and quantities of high quality or blended $CO_2$ to meet the requirements of virtually any type of clean-assembly tool or other industrial $CO_2$ process. Built-in machine communications, provided by a PLC controller, allows the present invention to be integrated with virtually any cleaning, assembly, testing or chemical processing system. Communications include level, pressure, temperature, phase, volume and leak-detection.

The present invention is an energy efficient and compact system, teaching new $CO_2$ treatment technologies including; 1) a self-cooling purification-refrigeration fluids recycling system, 2) a low-temperature UV-$O_3$—$TiO_2$ photocatalytic vapor and liquid phase treatment process, and 3) a new two-phase purification and delivery system which delivers both a pure liquid $CO_2$ and gas $CO_2$ phase from a single stage self-cooling equalization tank.

Embodiments of the present invention disclosed herein include, but are not limited to, the following:

Fully integrated gas cabinet design

Multimedia treatment and delivery, and recycling of purified gas and liquid or supercritical fluid Precise process fluid regulation comprising pressure, temperature, phase and volumetric control Use of a unique combination of modular in-line treatment technology including low-temperature distillation, coalescing filtration, selective membrane separation, thermalor photo-catalytic treatment, ultrafiltration membrane and closed-loop recycling.

A scaleable design to provide a range of process fluid qualities, capacities, phases and delivery to multiple $CO_2$ cleaning and assembly tools Use of low pressure and low temperature sources of carbon dioxide gas to minimize the initial transfer of supply-side contaminants into the fluids management system Novel closed-loop and auto-cooling recycling designs which use less space and more efficiently utilize heat flow A novel photocatalytic treatment module and design provides a non-thermal technique for oxidizing volatile organic contaminants entrained in vapor phase $CO_2$ using UV light, photo-reactive catalysts and in-situ ozone generation, with re-circulation of liquid phase as a polishing sequence Modular on-line analysis capability to ensure consistent delivery quality Automatic switch-over system and equalization tank designs provide a continuos supply of process fluids to the fluids management system and cleaning-assembly tools during peak demand periods with no interruptions A novel equalization tank design provides continuous supply of purified liquid and gaseous $CO_2$ from a source of low pressure carbon dioxide gas while providing self-refrigeration for condensation and cooling processes Use of energy efficient oil-free and double acting pneumatic pumps to fluidize and transfer varying amounts of process fluids System accepts a broad range of $CO_2$ and other process gas pressure inputs of between 200 psi to 800 psi from any industrial gas provider and produces a range of process fluid pressure outputs of between 850 psi and 2500 psi and temperatures of between 60 F and 120 F Efficient use of treatment wastestreams—membrane regeneration gases and pneumatic power fluids—as heat exchange media, including pneumatic vortex thermal control Intelligent electronic control to provide fluid management system and cleaning-assembly equipment communication and remote diagnostics and metering via an internet access protocol, with an operator interface panel

BRIEF DESCRIPTION OF THE DRAWINGS

The features and advantages of the present invention will become apparent from the following detailed description of a preferred embodiment thereof, taken in conjunction with the accompanying drawings in which.

DETAILED DESCRIPTION OF A PREFERRED EMBODIMENTS

Figure 1:
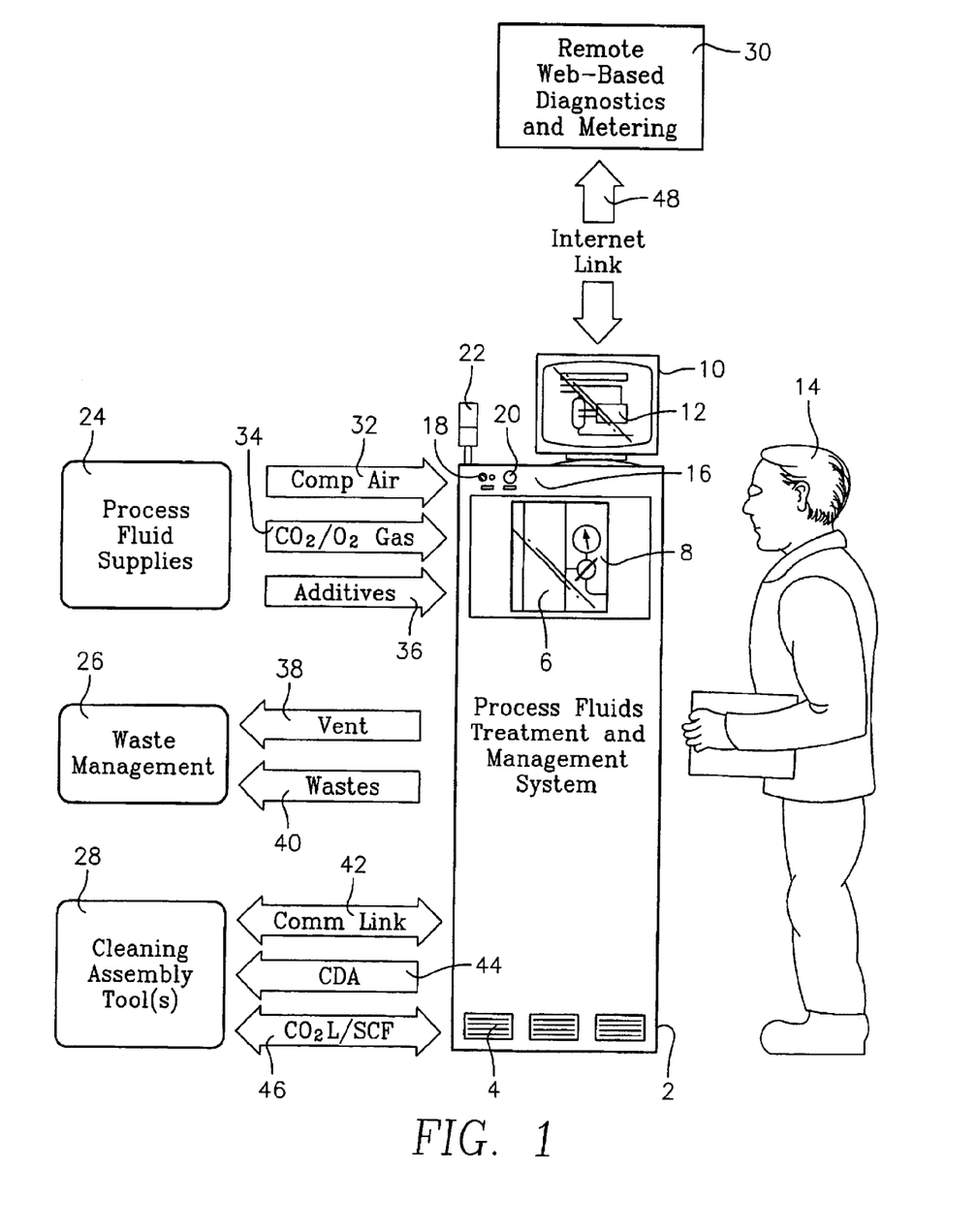
FIG. 1 is an overall schematic diagram of the exemplary $CO_2$ process fluids management system in relation to process fluid supplies, waste management and factory cleaning and automation tools.

Turning now to a more detailed consideration of the preferred embodiments of the present invention, FIG. 1 illustrates an overall schematic diagram of the exemplary $CO_2$ process fluids management system in relation to process fluid supplies, waste management and factory cleaning and automation tools. As shown in the figure, the exemplary $CO_2$ process fluids management system comprises a metal gas cabinet (2), which has one or more ventilation panels (4) mounted at the base to allow air flow from below, up through the interior of the cabinet (2) and to exit through the top or sides of cabinet (not shown). Contained within the cabinet (2) is a process fluids management system (6), hereinafter termed "PFMS", which is visible through an optional panel window (8). In this exemplary design, a computer monitor (10) is mounted atop the cabinet (2), displaying a graphical representation (12) of the PFMS contained therein, which allows an operator (14) to view and manage the PFMS. The exemplary cabinet (2) also contains a control panel (16) with a main power control switch (18) to turn on the PFMS and an emergency stop button (20) to stop the PFMS in the event of a leak or other hazardous condition. A safety light stack (22) sits atop the cabinet (2) which gives a visual indication of the operational condition of the PFMS, for example "green" for normal operational status, "yellow" for a standby condition, and "red" for a shutdown safety condition.

Interconnections to and from the exemplary PMFS cabinet (2) comprise three standard groups—process fluid supplies (24), waste management (26) and cleaning-assembly tool(s) (28). A fourth and optional interconnection group comprise an ethernet or internet connection (30) for remote access to the PFMS over a factory or phone line connection. The various interconnections comprise high- or low-pressure pipes or electronic cable assemblies. The process fluid supplies group (24) comprises fluid pipes delivering shown as arrows in the figure. For example, compressed air (32) at between 70 and 150 psi, gaseous carbon dioxide and oxygen mix (34) at between 200 and 832 psi, and gaseous or liquid chemical additives (36) are delivered to the PFMS. The waste management group (26) delivers through a vent pipe (38) gases such as purging gas, membrane drying gas, cooling gases and pneumatic gases and liquid wastes through a waste pipe (40) to a suitable waste management system (26). These wastes have been separated from PFMS purification and recycling operations as described below in this specification. The cleaning-assembly tool group comprises a bi-directional communication cable link (42) for passing electronic information about the operational condition of the PFMS to the cleaning-assembly tool(s) (28) and vice-versa. Purified process fluids are delivered from the PFMS through one or more delivery pipes. A clean-dry-air (CDA) pipe (44) delivers CDA, or a purified inert gas, to the cleaning-assembly process tool(s) (28) and a purified carbon dioxide pipe (46), which may be a pair of delivery and recycle return pipes, delivers purified carbon dioxide in liquid or supercritical fluid state to (and from) the cleaning-assembly tool(s) (28). A fourth and optional interconnection comprises an ethernet or internet electronic connection (48), which connects the PFMS control system over a factory or phone line connection to allow a remote operator to access, monitor and meter the PFMS.

Figure 2:
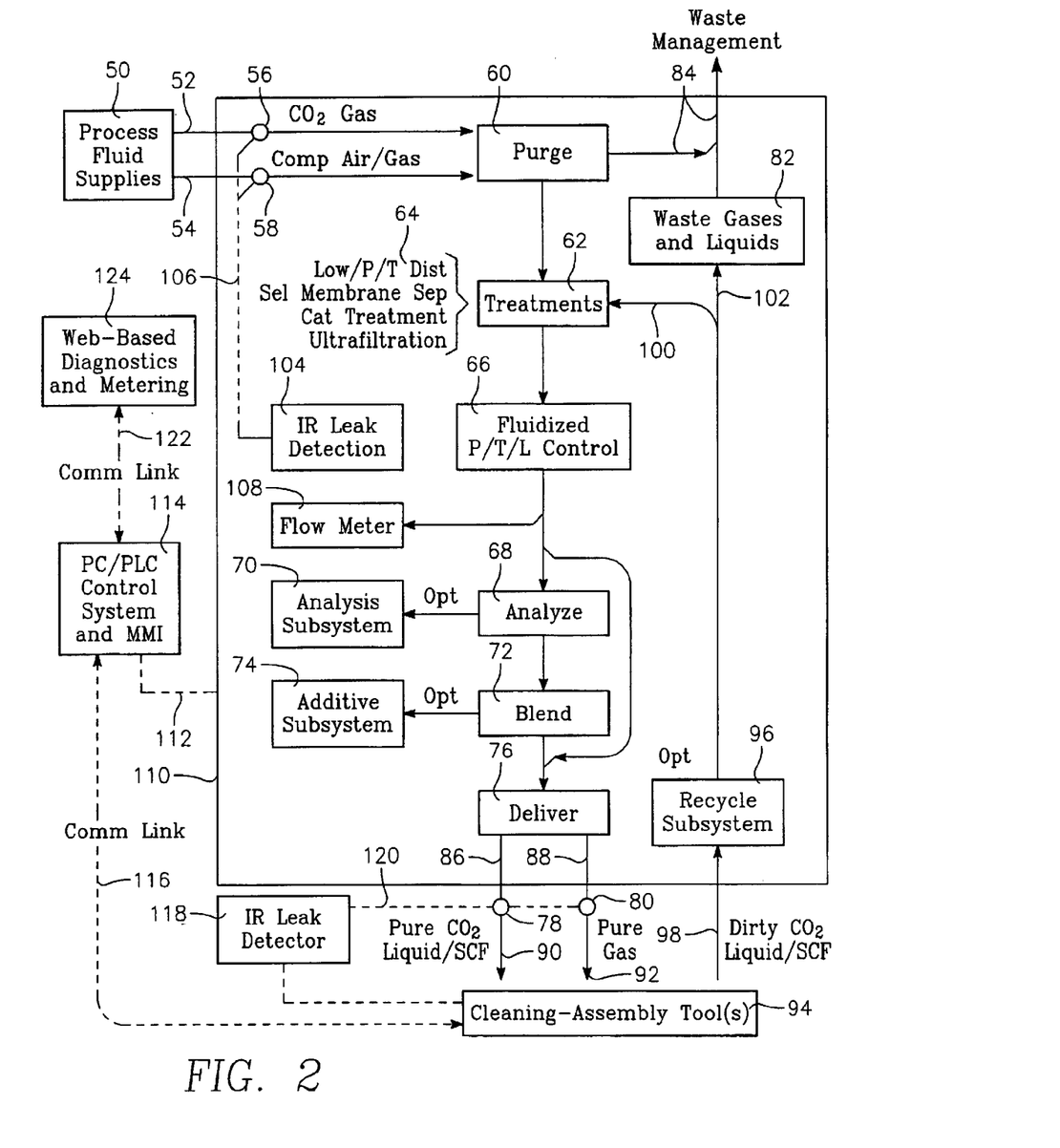
FIG. 2 is a schematic diagram showing the interconnection of various modules and subsystems of the exemplary $CO_2$ process fluids management system.

Having thus described the overall design of the exemplary PFMS, FIG. 2 is a schematic diagram showing the interconnection of various modules and subsystems of the exemplary PFMS. The exemplary PFMS comprises a "treatment train" with discrete modules or subsystems which take process fluids from sources of supply (50), for example carbon dioxide gas (52) from a 300 psi—0 F supply source and compressed air (54) from an industrial air compressor at between 70 psi and 120 psi and moves these process fluids through a series of treatments, indicated by various flow arrows in the figure. Each supply of process fluid is plumbed into the PFMS using suitable high-pressure inlet valves—a carbon dioxide gas inlet valve (56) and a compressed air or gas inlet valve (58). Upon introduction into the PFMS, process fluids follow a serial treatment comprising a system purging operation (60), various combinations of physico-chemical and thermal-chemical purification treatments (62) which are dependent upon the quality of the process fluids supplies and desired chemical and physical purity required for a particular cleaning-assembly tool. As shown in the figure, treatments (64) may comprise one or a combination of low-temperature distillation, selective membrane filtration, catalytic treatment and ultrafiltration. These exemplary treatments are designed to be used as follows—to remove bulk impurities (low-temperature distillation), to remove trace water vapor (selective membrane separation), to remove trace volatile hydrocarbons (catalytic treatment) and to remove trace fine particulate matter (ultrafiltration). Following treatments (62), process fluids are regulated using a pressure regulator or compressor to provide the desired fluidization conditions (66) for each fluid stream. PFMS process fluid conditions such as pressure, temperature and phase (gas, liquid, supercritical) are controlled at this point. Optional treatment steps, which follow the fluidization step (66), include analysis (68), with an analytical subsystem module (70) to determine the chemical purity of the treated and fluidized process fluid, and a blending step (72) with an additive injection subsystem (74) to inject gaseous or liquid additives into the treated and fluidized process fluids. Following purge (60), treatments (62) and fluidization (66) steps, and optional analysis (68) and/or chemical blending (72) steps, the purified and/or modified process fluid is delivered (76) under pressure, temperature and phase conditions, as required, through a purified carbon dioxide outlet valve (78) and a purified gas outlet valve (80). Waste purge gases, pneumatic power gases and other waste gases from the various modules are fed through a waste gas and liquid collection module (82) and discharged from the PFMS through various pipes (84). Purified process fluids, for example liquid or supercritical carbon dioxide (86) and purified gas (88) are delivered using a carbon dioxide delivery pipe (90) and a pure gas pipe (92) to a cleaning-assembly tool(s) (94). The exemplary PFMS may include an optional liquid or supercritical carbon dioxide recycle subsystem (96). Spent process fluids (98), delivered from a cleaning-assembly tool (94) to the recycling subsystem (96) are treated using a high pressure distillation process. Bulk purified fluid flows from the recycling subsystem through a pipe (100) to the treatment module (62) and separated wastes comprising liquids and gases flows from the recycle subsystem through a pipe (102) into the waste module (82).

The exemplary PFMS may also include an infrared carbon dioxide leak detector (104) which may be connected in series (106) with the process fluid supply valves to cause the inlet carbon dioxide supply valve (56) and inlet compressed gas inlet valve (58) to close in the event of a gas leak. The exemplary PFMS may also contain a flow meter or other such metering device (108) to measure the amount of process fluids flowing through the PFMS.

The entire PFMS comprises an integrated network (110) of interconnected delivery pipes, automatic valves, electronic pressure sensors, temperature sensors, level sensors, compressors, holding tanks, regulators, treatment devices, gages, cooling devices, among many other components. The operation of the PFMS is monitored and controlled through an electronic control network (112) and connected to a PC or PLC system (114) with a suitable man-machine interface such as a computer monitor or graphical display. The control system (114) is connected to and communicates with the cleaning-assembly tool(s) via a communication cable (116). The cleaning-assembly tool (94) receives exemplary information such as fluid supply pressures, temperatures and volumes from the control system (114) and sends information such as leak detection using a locally placed infrared carbon dioxide leak detector (118). For example in the event of a supply side problem, such as a low/empty process fluid condition, the clean-assembly tool is alerted to this condition so that an operation may be halted until the condition is corrected. In another example, if the local leak detector (118) detects abnormal carbon dioxide levels within the vicinity of the cleaning-assembly tool environment, the control system is alerted to close carbon dioxide outlet valve (78) and/or pure gas outlet valve (80) through an independent control circuit (120) and to send alarm conditions back to the cleaning-assembly tool (94).

Finally, the exemplary PFMS system may be connected through a communication link (122) using an internet or ethernet connection (124) to the control system (114) to provide for remote monitoring and metering of the PFMS.

Figure 3:
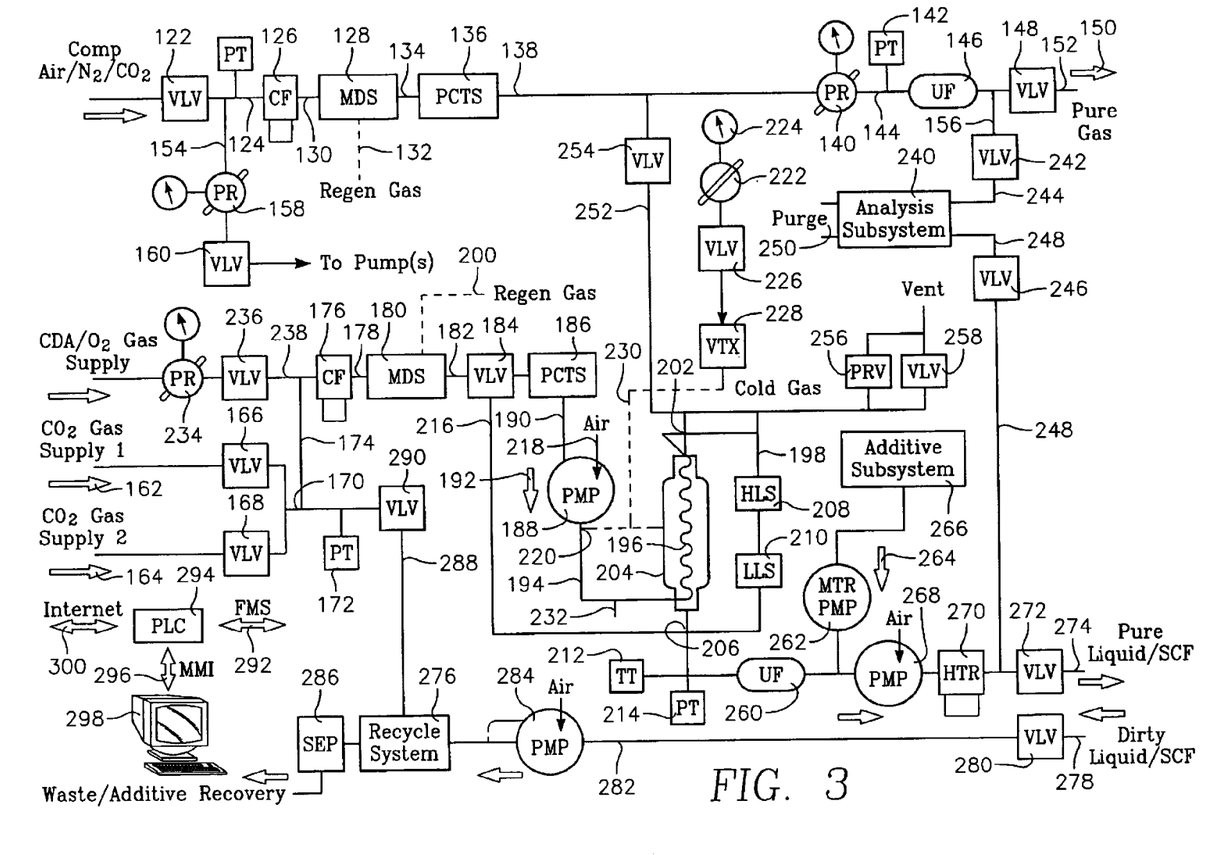
FIG. 3 is a schematic diagram of the exemplary $CO_2$ process fluids management system.

Having thus described in more detail, the major interconnections and control system for the exemplary PFMS, FIG. 3 gives a schematic diagram of the exemplary PFMS showing in much more detail the interconnection of various components such as valves, gages, sensors, and treatment modules. The following discussion is divided between pure gas and pure liquid or supercritical fluid production modules, with separate discussions for analysis, blending and recycling subsystems.

Shown in the exemplary PFMS, pressure-regulated compressed air or gas at between 70 and 150 psi is introduced into the PFMS through an inlet valve (122) and pipe (124) and flows through a pre-filter or coalescing filter (126) to remove gross impurities such as water and oil vapors. Following this operation, the pre-treated gas flows into a selective membrane filter (128), available from Whatman Corporation, through an inlet pipe (130) whereupon trace water vapor entrained in a low-flow purge stream internally is bled continuously from the selective membrane system through a regeneration pipe (132). Dry filtered gas flows from the selective membrane filter through outlet pipe (134) and into a catalytic treatment unit (136) to destroy trace hydrocarbon contaminants entrained in the dry gas stream using a thermal catalyst or a novel photocatalytic treatment described below in this specification. Clean dry gas flows from the catalytic treatment unit (136) through a outlet pipe (138) and is pressure-regulated to a desired output pressure using a pressure regulator and gage assembly (140). A pressure transmitter (142) located on a regulated clean dry gas outlet pipe (144) electronically measures the output pressure of the clean dry gas produced by the clean gas treatment system. The treated and regulated gas is transferred through a pipe (144) and into a ceramic or stainless steel ultrafiltration membrane filter (146) to remove trace particulate matter down to 0.01 microns from the treated gas stream. Following ultrafiltration, the clean dry regulated and filtered gas is delivered to the clean-assembly tool (not shown) through an outlet valve (148) as indicated by flow arrow (150) and outlet pipe (152).

As shown in FIG. 3, the clean gas treatment train contains several output pipe streams comprising compressed gas (154) and membrane regeneration wet gas (132) which are used herein for pneumatic power and vortex cooling operations, and an analysis pipe gas stream (156) used to optionally sample and analyze the purity of the treated gas and to serve as a means for purging contaminants from the treatment train. Returning to the compressed air output stream (154), this gas stream is connected to a regulator and gage assembly (158) and pneumatic power valve (160) to regulate and deliver compressed gas to various compressor pumps and vortex cooling system described below. The regeneration gas stream (132) is delivered to heat exchangers on the various compressors described below to provide cooling of fluidized process fluids.

The exemplary PFMS contains two independent carbon dioxide supply connections as indicated by inlet arrows; $CO_2$ supply 1 (162) and $CO_2$ supply 2 (164) through inlet valve 1 (166) and inlet valve 2 (168). $CO_2$ gas is supplied under a pressure of between 200 and 832 psi. This design provides redundancy so that the PFMS does not have to go off-line to change-out the carbon dioxide supply. Both inlet supplies are connected to a common inlet pipe (170) which contains a pressure sensor (172) to measure inlet supply pressure. Carbon dioxide gas flows through a pipe (174) and into a pre-filter or coalescing filter (176) to remove gross impurities as described above with the clean gas treatment, through a pipe (178), and into a selective membrane filter (180) to remove trace moisture as described above with the clean gas treatment. Pre-filtered dry carbon dioxide flows from the membrane filter (180) through a pipe (182), through a three-way valve (184) and into a catalytic treatment unit (186) to destroy trace hydrocarbon contaminants entrained in the pre-filter dry carbon dioxide gas. Pure dry carbon dioxide flows from the catalytic treatment unit (186) and is introduced into a compressor pump (188), equipped with an air cooled heat exchangers (not shown), through an inlet pipe (190) and as indicated by flow arrow (192), fluidized through outlet pipe (194), through a tube-tube heat exchanger (196) and into a vapor-liquid separation and level-control bridge (198). Regeneration gas (200) flowing from the membrane filter (180) as described for the clean gas system above is piped to the compressor cooling heat exchanger. The level control bridge (198) comprises a loop of pipe connecting the top port (202) of an equalization holding tank (204) with the bottom port (206). Affixed to the level control bridge is a high level optical sensor (208) and an low level optical sensor (210). These level sensors control the operation of the compressor pump—with the high level sensor (208) turning off the compressor (188) and the low level sensor (210) turning on the compressor. This design enables automatic control of equalization volume of purified liquid carbon dioxide contained within the equalization tank (204). The purpose of the equalization tank is to provide a buffer for down-line clean-assembly tool supply demand as well as provide pressure and temperature stabilization and separation of phases of purified dense fluid. Connected to the level control bridge is a temperature sensor (212) and pressure sensor (214). A recirculation pipe loop (216) connects the equalization tank (204) to a 3-way valve (184), which when actuated allows the contents of the equalization tank (204) to be recirculated through the catalytic treatment unit (186) to provide extended catalytic treatment.

Pneumatic power for the compressor is derived from a connection to the compressed air valve (160) to the power inlet (218) of the compressor. Cooled compression air (220) from compressor is used to cool the process fluid through a built-in heat exchanger (not shown). Coolant for the fluidized product flowing through the heat exchanger (196) is derived from compressed air (218) connected to compressed air inlet valve (160), regulator (222) and gage (224), coolant valve (226) and into a vortex cooler (228). The vortex cooler separates air into two fractions—a heated fraction which discharged through a vent line (not shown) and a cold gas fraction (230). The cold gas (230) is piped into the heat exchanger (196) and counterflows, relative to the flow of compressed purified carbon dioxide, extracting the heat of compression causing the purified product to liquefy under pressure from the compressor (188). Waste coolant, now heated, flows (232) from the outlet of the heat exchanger (196).

Maintaining liquid phase within the equalization tank is accomplished using two independent circuits. The vortex coolant valve (226) is turned on and off as required based upon a temperature measurement made using the temperature sensor (212) to maintain the contents of the equalization tank at a temperature below the critical temperature (<88 F) of carbon dioxide. The high level sensor (208) and low level sensor (210), in combination with a pressure sensor (214), turn on and off the compressor to maintain the pressure and phase within the equalization tank using both an optical detection of a meniscus and a pressure measurement.

Catalytic treatment is enhanced by the presence of a small partial pressure of oxygen. As such a source of oxygen, either pure oxygen or pure air, may be introduced under pressure using a regulator and gage assembly (234) and inlet valve (236) through an inlet pipe (238). Oxygen gas is introduced into the inlet carbon dioxide gas as the mixture enters the coalescing filter (176).

The exemplary PFMS may contain an analytical system (240) such as a UV-VIS spectrophotometer. This type of system will analyze gases or liquids using a high-pressure view cell or tee (not shown). Purified fluids from the treatment system are sampled using inlet valves, which also serve as purge valves for the entire system. Purified gas is sampled using a gas sampling valve (242) and introduced through a gas sample line (244). Purified liquid is sampled using a liquid sampling valve (246) and introduced into the analysis subsystem (240) through a sample line (248). Analyzed or purge gases are discharged from the analysis subsystem and into the waste management module (250). Clean purge gas may also be obtained from the equalization tank. This is accomplished through the use of a gas pipe (252) connecting the top of the equalization tank (202) to the clean gas pipe (138) via a connection valve (254). Moreover, this design feature provides enhanced temperature and pressure control within the equalization tank (204), which is discussed in detail later in this specification.

The equalization tank (204) is connected to a pressure relief valve (256) and ventilation valve (258) to provide for purging and pressure safety relief through a common waste management vent (not shown).

Purified liquid carbon dioxide contained within the equalization tank (204) is withdrawn from the bottom (206) of the tank and flows through an ceramic or stainless steel ultrafiltration membrane filter (260). Following this, the clean liquid may be injected with gaseous or liquid additives, using an optional metering pump (262), flowing as indicated by the arrow (264) from an additive supply subsystem (266).

Additives may include sulfur hexafluoride, ozone, isopropanol, tetrahydrofurfuryl alcohol, soy methyl esters, nitrous oxide, benzyl alcohol and many other liquids and gases. Following injection, the pure or blended liquid carbon dioxide may be fluidized to supercritical conditions (a P>1100 psi and a T>88 F) pressurized using a booster pump (268) and an in-line heater element (270). Following treatment, blending and fluidization operations, pure or blended liquid or supercritical carbon dioxide is delivered to a cleaning-assembly tool (not shown) through pure liquid outlet valve (272) and through delivery pipe (274).

An optional component of the PFMS is a carbon dioxide recovery and recycling subsystem (276). Spent carbon dioxide process fluids (liquid or supercritical carbon dioxide) containing contaminants and optionally additives is returned from the cleaning-assembly tool through inlet pipe (278), inlet recovery valve (280), inlet recovery pipe (282) and using recovery compressor pump (284) to pump the spent process fluids into a recycling subsystem (276). The recycle system separates the spent process fluids using high-pressure distillation into a waste fraction which is separated from recycle system using a separator (286) and a recovered and purified bulk liquid and gas, discussed in more detail below. Recovered gases and liquids are returned to the treatment train via a recovery pipe (288) and recovery inlet valve (290) into the inlet process gas manifold (170) for polishing and fluidization as discussed above.

The entire integrated network of valves, sensors, pumps, vortex cooler as well as optional analytical, additive injection, supercritical fluidization and recycling subsystems are connected (292) to a PC or PLC system with software (294) and connected (296) to a man-machine interface system (298). An optional internet or factory ethernet connection (300) provides for remote access and diagnostics.

Figure 4:
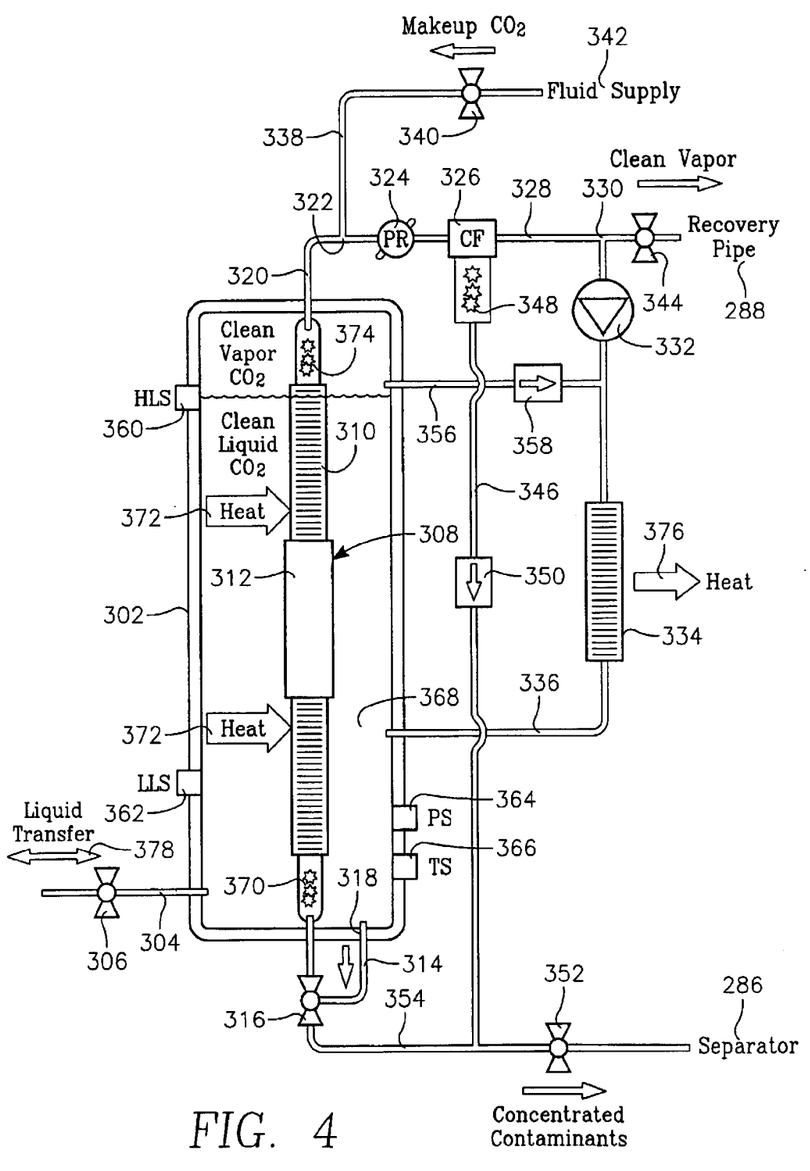
FIG. 4 is a schematic diagram of the exemplary self-refrigerating dense fluid recycling system.

Having thus described in detail the exemplary PFMS, FIG. 4 gives is a schematic diagram of a novel self-refrigerating purification apparatus and process for use with the exemplary PFMS described in FIGS. 1, 2, and 3 or may be used itself as a stand-alone dense fluid recovery and purification system. Shown in FIG. 4 is a thermally insulated high-pressure and cylindrical equalization tank (302) which accepts the delivery of spent liquid carbon dioxide from a clean-assembly process tool via a recovery pipe (304) and recovery input valve (306). Centrally located within the equalization tank (302) is a second high-pressure cylinder comprising a expander-concentrator tank or tube (308). The expander-concentrator tube contains a heat exchanging surface (310) and contains an enlarged expansion tube (312) interconnected therein. Thus, process fluid to be contained within the central expander-concentrator tube is isolated from the fluid contained within equalization tank, except through thermal transfer means. The central expander-concentrator tube is connected to the equalization tank using a connection pipe (314) and a 3-way valve (316) through a port located at the bottom of the equalization tank (318). Thus, by opening the 3-way valve (316), fluid contained within the equalization tank (302) can be selectively moved to the interior lower hemisphere (liquid zone) of the expander-concentrator tube (308). A vapor transfer pipe (320) connects the interior upper hemisphere (vapor zone) of the expander-concentrator to a vapor bridge (322), which itself connects to a pressure regulator (324) and through an aerosol separator filter (326). From the aerosol filter (326), a vapor transfer pipe (328) connects to a transfer bridge (330). Vapor contained within the vapor bridge (330) connects to a compressor (332), into and through a heat exchanger (334) and returns to the interior of the equalization tank (302) through condenser pipe (336). The heat exchanger (334) may be of any variety including a finned tubular radiator, vortex cooled tube, tube-tube. Heat may be extracted using an ambient exchange, forced air or using a re-circulated refrigerant. The vapor bridge (322) is connected to a make-up supply of carbon dioxide using a makeup transfer pipe (338) and makeup gas transfer valve (340). The make-up fluid supply (342) may be obtained from the inlet process gas supply described in FIG. 3 or any supply of carbon dioxide if used alone. Clean vapor contained in the vapor bridge (330) may be extracted through clean vapor valve (344) for polishing treatments and fluidization through recovery pipe (288, FIG. 3) of the exemplary PFMS. The exemplary self-refrigerating recovery system contains an aerosol recovery pipe (346), which is connected to the bottom of the coalescing filter (326). The recovery pipe (346) transfers aerosols (348) trapped within the coalescing filter element through a one-way valve (350) and through a waste blow-down valve (352) to a gas-liquid separator (286, FIG. 3). The 3-way transfer valve (316) is also connected to the gas-liquid separator (286, FIG. 3) via the waste blow-down valve (352) and a waste transfer pipe (354). A vapor transfer pipe (356) connects the upper hemisphere (vapor zone) of the equalization tank (302), through a one-way valve (358) to the inlet side of the heat exchanger (334). This vapor transfer pipe provides a means for condensing vapors within the upper hemisphere of the equalization tank (302). Finally, the exemplary recycling system contains a means for measuring fluid levels, pressure and temperature within the equalization tank (302). A high level optical sensor (360) is located in the upper hemisphere of the equalization tank (302) to control the maximum liquid carbon dioxide to be contained and a low level optical sensor (362) is located in the lower hemisphere of the equalization tank (302) to control the minimum liquid carbon dioxide to be contained. The sensors thus described also control the amount of liquid carbon dioxide that will be contained within the central expander-concentrator tube when the 3-way transfer valve (316) is opened to connect the interior of the equalization tank (302) to the interior of the expander-concentrator tube (308). A pressure sensor (364) and temperature sensor (366) mounted in the lower hemisphere of the equalization tank (302) monitor liquid pressure and temperature, respectively.

Having thus described the various components of the exemplary purification-refrigeration system above, the following discussion describes the principles of operation of the exemplary apparatus. Referring again to FIG. 4, liquid carbon dioxide (368) contained within the equalization tank (302), containing contaminants and/or additives, is transferred into the internal expander-concentrator tank (308) through transfer line (314) and through opened 3-way valve (316). Following which, transfer valve (316) is closed and compressor pump (332) is turned on. Contaminated fluid (370) contained within the expander-concentrator tube begins to boil as the compressor pump (332) demands supply. This operation causes the contaminated fluid to cool rapidly and heat (372) is exchanged from the dense fluid contained within the equalization tank through the heat exchange media (310) and into the boiling contaminated dense fluid (370). Simultaneously, the dirty vapor (374) boiling out of the contaminated liquid (370) is transferred under the action of the compressor (332) through the vapor transfer bridge (320) through a regulator (324) and through a coalescing filter (326), which removes and separates the aerosols (348) contained within the vapor. The clean vapor is transferred through the compressor (332) and heat exchanger (334) where excess heat (376) is separated from the clean compressed vapor, causing the vapor to re-condense and flow back into the interior of the equalization tank (302) through clean condensate return pipe (336). As such, this apparatus and process provides simultaneous purification and refrigeration of the dense fluid. Concentrated contaminants contained within the expander-concentrator tube (308) and within the coalescing separator (326) are periodically blow-down and separated from the recycler by opening 3-way transfer valve (316) to connect the expander-concentrator tube to a separator (286, FIG. 3) through waste transfer pipe (354) and waste transfer valve (352). The blow-down process also keeps the internal heat exchange surface free of excess build-up and may be performed as many times as required. However, following periodic blow-down operations, make-up carbon dioxide is required from an external source (342). The high level sensor (360) and low level sensor (362) are used to maintain the volume within the equalization tank (302). Finally, this purification-refrigeration process may be performed continuously or on a batch basis to produce any desired purity of liquid carbon dioxide contained within the equalization tank (302). During the aforementioned purification-refrigeration process, recycled dense fluid may be delivered to and from (378) the recycling system through transfer pipe (304) and transfer valve (306), or clean vapor may be transferred from the system through vapor transfer valve (344) and vapor bridge (330), or clean make-up carbon dioxide may be added to the equalization tank (302) through make-up valve (340) and make-up vapor pipe (338).

Figure 5:
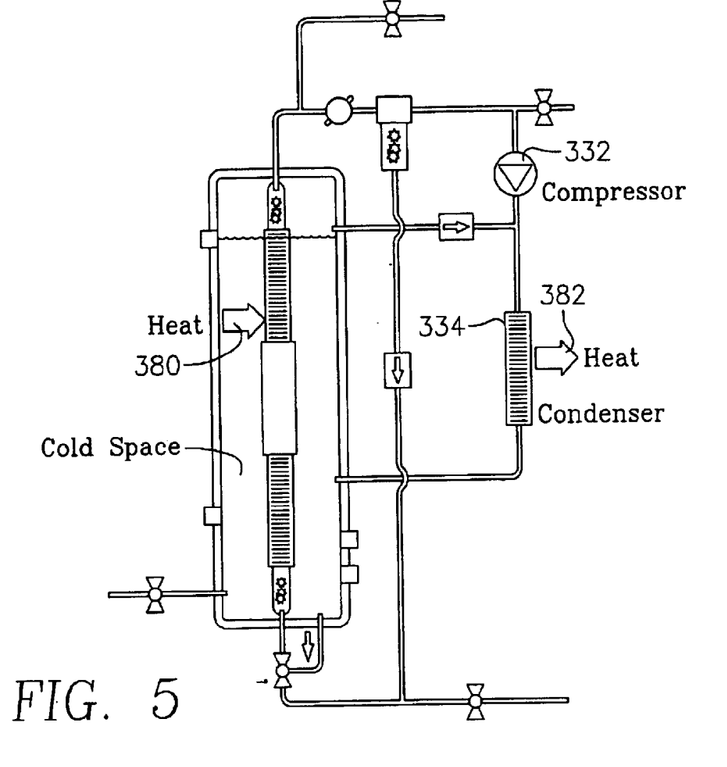
FIGS. 5 and 5A are a schematic diagram and graph respectively, showing the relationship between the purification rate and refrigeration rate of the exemplary self-refrigerating dense fluid recycling system of FIG. 4.
Figure 5A:
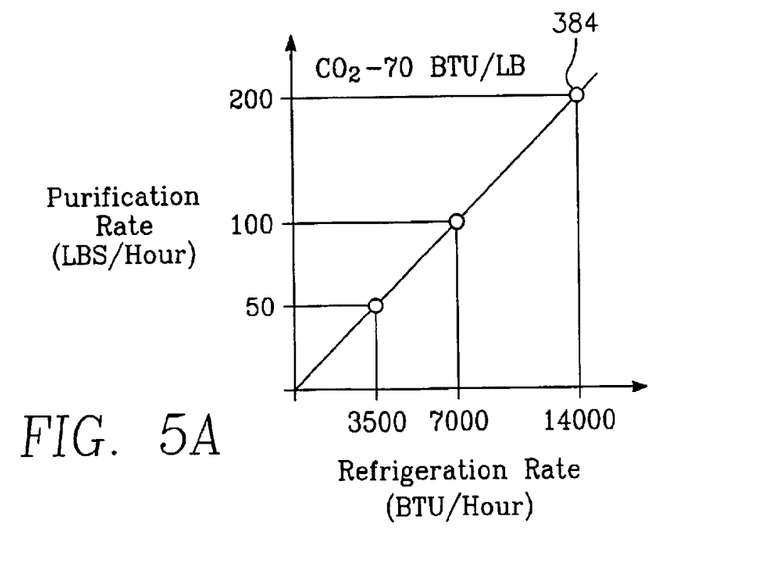

Referring to FIG. 5, the exemplary purification-refrigeration apparatus and process described in FIG. 4 produces both significant refrigeration and purification capacities. As shown in FIG. 5, the amount of heat extracted from the equalization tank, the cold space (380), and removed to the ambient atmosphere (382) through the condenser unit (334) is directly proportional to the purification rate as determined by the volume of vapor recirculated and compressed through the compressor pump (332). As shown in the graph of upon an average heat of vaporization value for liquid carbon dioxide of 70 BTU/lb at 60 F, refrigeration rates as high as 14,000 BTU/hour can be produced within the cold space based upon purification rates of 200 lbs/hour (384)—expanded vapor moved through the compressor pump (332) and re-condensed within the condenser unit (334).

Figure 6:
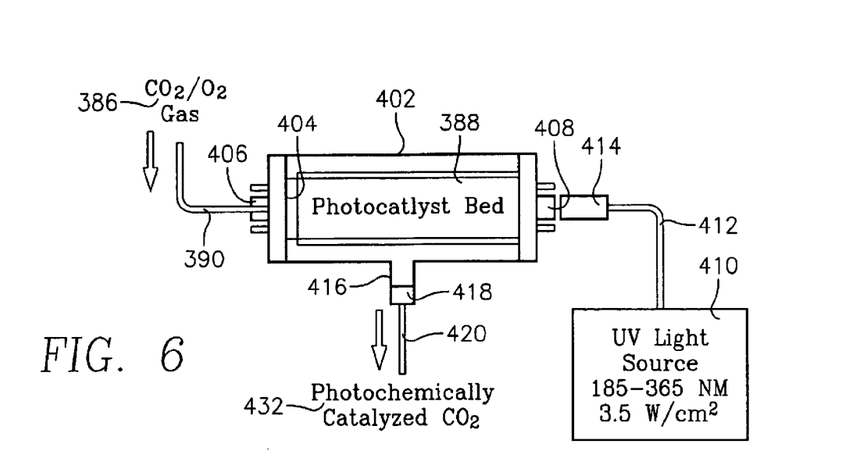
FIG. 6A is a schematic diagram of the photocatalytic bed of the exemplary dense fluid $UV/O_3$ photocatalytic treatment system of FIG. 6.
FIG. 6B is a flow diagram of the photocatalytic bed of the exemplary dense fluid $UV/O_3$ photocatalytic treatment system of FIG. 6.
Figure 6A:
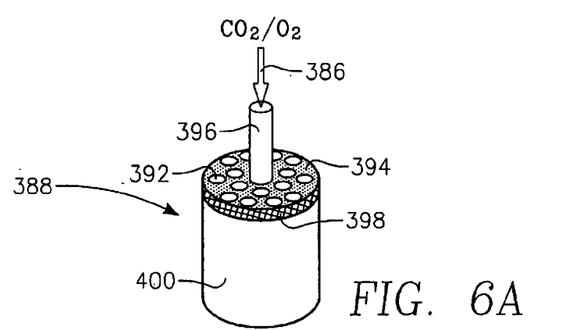
Figure 6B:
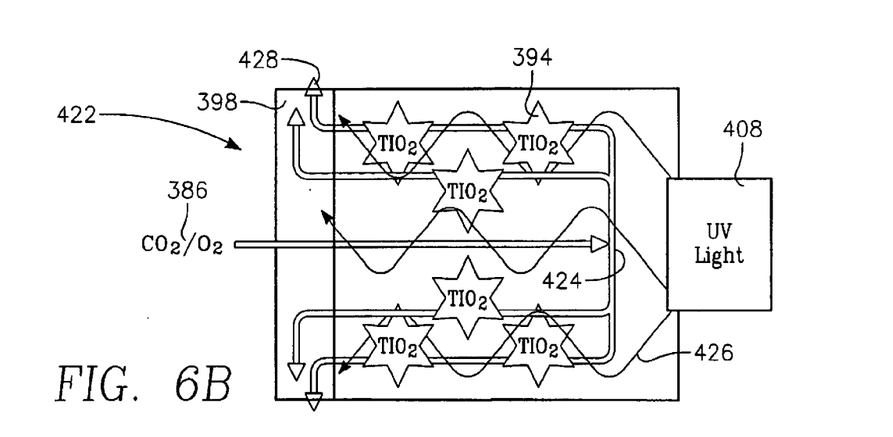

Referring to FIGS. 6, 6A, and 6B, novel photocatalytic treatment apparatus and process may be used within the PFMS described as "PCTS" in FIG. 3 (136 and 186) to destroy unwanted hydrocarbon contaminants contained within a dry filtered carbon dioxide stream containing a trace amount of oxygen gas. As shown in the figures, a mixture of carbon dioxide gas or liquid containing trace hydrocarbon contaminants and a small amount of oxygen gas (386) enters a photocatalytic bed (388) through an inlet pipe (390), whereupon the contaminated carbon dioxide gas mixture, in the presence of oxygen and $TiO_2$ catalyst, is subjected to an intense ultraviolet radiation (UV) having a preferred wavelength of between 185 nm and 365 nm and an photonic energy level of up to 3.5 W/cm$^2$ or more. As shown in the construction diagram of FIG. 6A, the exemplary photocatalytic bed (388) consists of an array of solid UV light pipes (392) packed within a matrix of $TiO_2$ particles (394). The light pipe array is designed to allow transmitted UV light to escape along its axis within the catalyst bed. At the center of this reactor bed is contained a hallow inlet pipe (396) inserted completely through the photocatalyst bed which connects to supply of contaminated carbon dioxide mixture (386) through the inlet gas pipe (390). The reactor bed is enclosed in a porous ceramic sleeve (398) which itself is over-wrapped with a solid sleeve (400) constructed of stainless steel or PTFE (Teflon). When inserted into the photocatalytic reactor body (402), which comprises a stainless steel TEE, the inlet side of the photocatalytic bed is sealed against a solid Teflon washer (404) and fitting (406) while the UV end of the photocatalytic bed is sealed with a Teflon washer containing a centrally-mounted UV window (408). Coupled to the UV window is a UV light source (410) which may be delivered to the UV window (408) using a light pipe (412) and focusing lense (414). The bottom port (416) of comprises a fitting (418) and UV treated fluid outlet pipe (426).

Referring to the fluid flow diagram (422), of FIG. 6B, the exemplary photocatalytic bed is designed to allow the contaminated carbon dioxide mixture (386) to mix and flow from the UV side of the exemplary photoreactor (424), completely mixing with UV radiation (426), $TiO_2$ photocatalyst (394) and ozone, before exiting (428) into the internal cavity of the TEE through the exposed cylindrical portion of porous sleeve (398). The UV-$TiO_2$ catalyzed reaction (430) involves the direct oxidation of entrained hydrocarbons by UV photons as well as the formation of UV-catalyzed oxygen radicals and ozone gas at 185 nm, which serve as powerful hydrocarbon oxidation agents. UV radiation causes electrons to be discharged from the surface of the catalyst, further promoting the oxidation of organic contaminants. The UV-$TiO_2$ catalyzed reaction, when completed, converts hydrocarbons into carbon dioxide and trace water vapor without producing an extremely hot treated carbon dioxide stream common to thermal catalytic treatment units. Photochemically treated carbon dioxide (432) exits the photoreactor TEE (402) through an outlet pipe (420) and may then be fluidized and filtered as described herein. The photoreactor TEE (402) and photoreactor bed (388) may be designed and fabricated to virtually any tubular dimension, for example up to 6 feet in length and 3 inches in diameter, using standard stainless steel pipe and tee connections. Longer reactor beds and higher UV photonic energies in combination with oxygen produce more complete hydrocarbon oxidation treatments.

Figure 7:
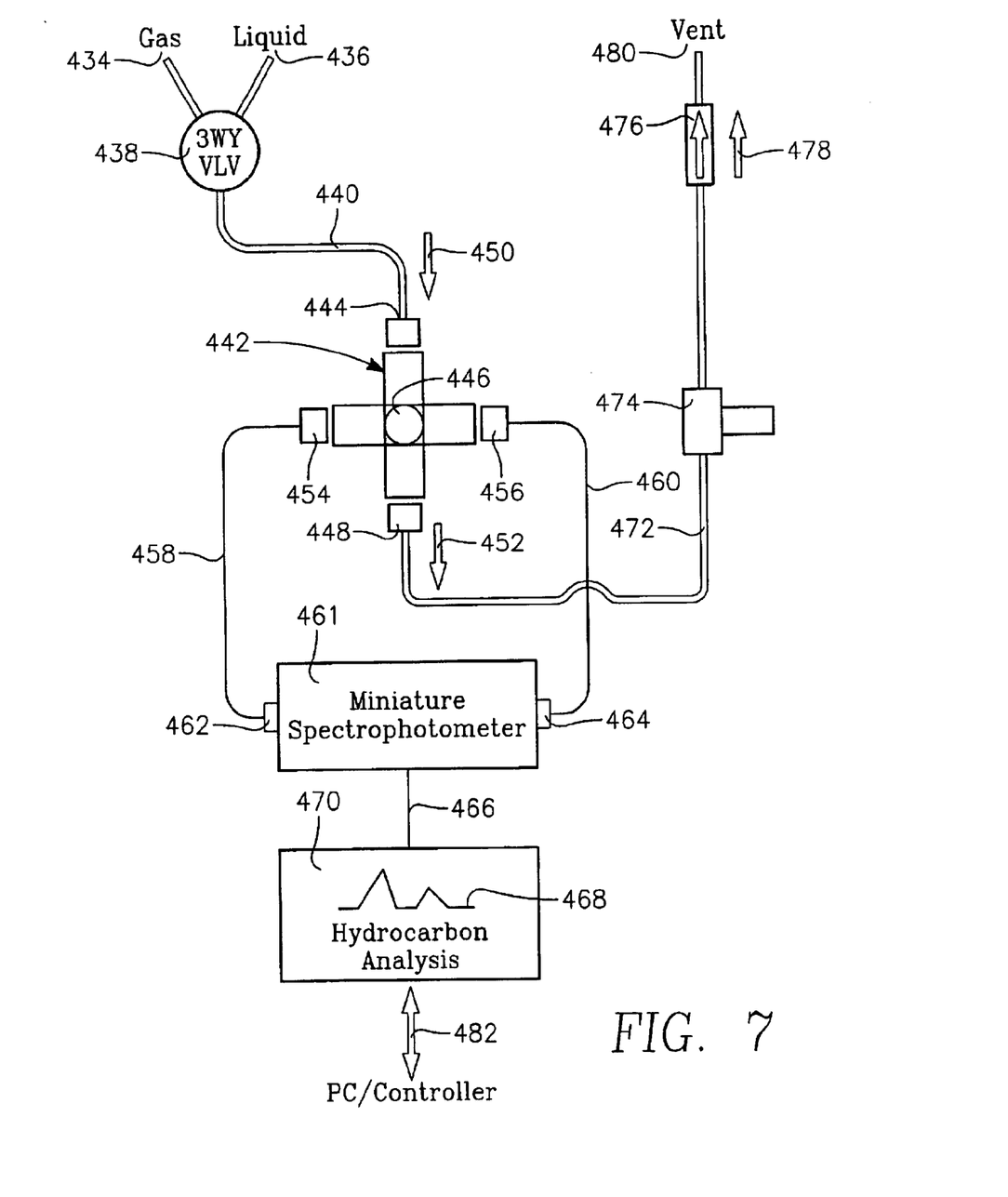
FIG. 7 is a schematic diagram of the exemplary on-line dense fluid analytical system.

FIG. 7 is a schematic diagram of a low-cost on-line dense fluid analytical system. Referring to the figure, purified gas (434) or purified liquid (436) derived from the present invention are optionally analyzed on-line to determine the residual hydrocarbon content. A 3-way valve (438) may be used to switch the flow pattern between the two independent purified products and an analyzer. For example, referring to FIG. 3, the 3-way valve described above may be inserted between the pure gas sample pipe (244) and pure liquid sample pipe (248). Returning to FIG. 7, purified process fluid flows through an analyzer inlet tube (440) comprising, for example, ⅛ inch polyetheretherketone (PEEK) polymer tubing whereupon it enters a high-pressure PEEK cross TEE (442). The PEEK cross TEE (442), available from UpChurch Scientific, Oak Harbor, Wash. and normally used for mixing or re-directing various high pressure gases in HPLC, is a novel method of sampling and analyzing $CO_2$ in various phases and under a flow-through design. PEEK has inherent high chemical compatibility, high-pressure and high-temperature tolerance are works in this embodiment as a high-pressure cuvette. In the present design, $CO_2$ process fluid enters at an inlet side of the PEEK cross tee (444), flows through a small internal cavity (446), and exits through an outlet side (448) of the PEEK cross TEE (442).

Thus sample fluid flow is indicated by an inlet flow arrow (450) and an outlet flow arrow (452). The PEEK cross TEE (442) also contains an analyzer inlet port (454) and an outlet analyzer port (456). A solid 300 um solarization-resistant fiber optic cable (458), available from JDS Uniphase, Ottowa, Canada, is inserted into the PEEK cross TEE on the analyzer inlet port (454) and another solid fiber optic cable (460) is inserted into the analyzer outlet port (456). PEEK compression fittings (not shown) are used to seal all fluid and fiber optic connections. The analyzer inlet cable (458) is connected to the output fiber optic connection port (462) of a miniature UV-VIS or Raman PC-based spectrophotometer (461), available from Ocean Optics, http://www.oceanoptics.com, and the analyzer outlet cable (460) is connected to the input signal port (464) of the spectrophotometer (461). The exemplary UV-VIS PC-based (ISA bus A/D card) spectrophotometer (461), Ocean Optics Model CHEM2000 UV-VIS, provides a high resolution analysis using fiber optic technology to deliver and analyze, in real time, 2048 wavelengths ranging from 200 to 850 nm with 1.5 nm optical resolution, providing transmission, absorbance, relative irradiance and kinetics measurements. Slave spectrophotometer channels may be added for expanded wavelength range. The signal output (466) from the exemplary spectrophotometer (461) is a software-based spectral analysis which gives a fingerprint (468) profile on a computer screen (470). The fingerprint represents the hydrocarbon content as measured between 200 nm and 850 nm. A pure carbon dioxide baseline fingerprint can be compared to the on-line fingerprints produced to determine the relative quality of the carbon dioxide being produced. As such, sampled gases and liquids flowing through the PEEK cross TEE (442) may be continuously analyzed and discharged through an outlet pipe (472). A precision 18-turn micrometering valve (474) with a back-flow prevention valve (476) is used to control the flowrate and direction (478), respectively, through the PEEK cross TEE (442). Using sample time and flowrate through the analysis cell, quantitative measurements may be obtained. Finally, analyzed gases and liquids are discharged to a common vent pipe (480) as part of the waste management module described in FIG. 2 and a go or no-go indication signal (482) is sent to the PFMS controller.

Figure 8:
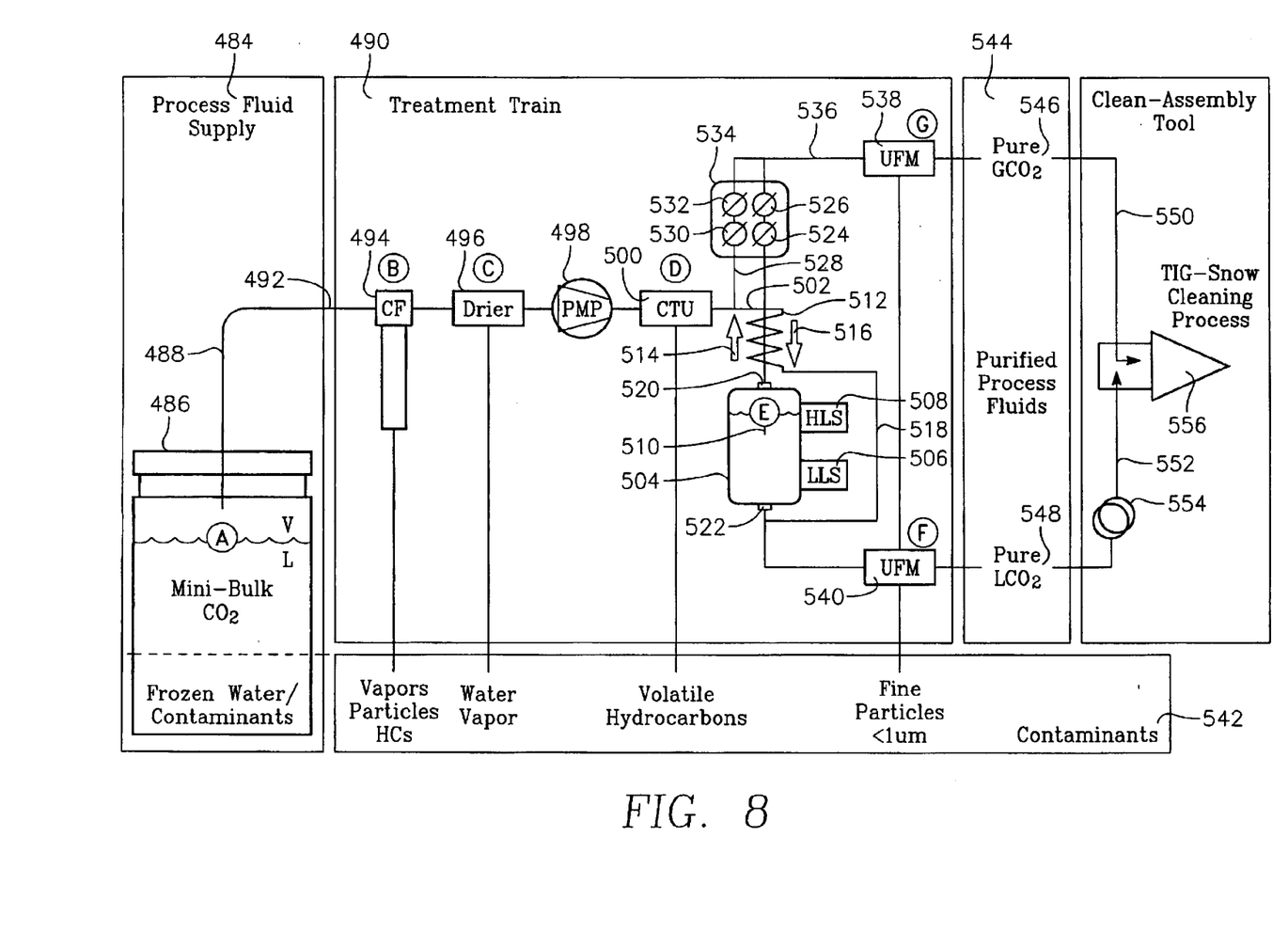
FIG. 8 is a schematic diagram of an exemplary self-refrigerating dense fluid treatment system which provides two purified process fluids—liquid $CO_2$ and gaseous $CO_2$—from a low pressure and low temperature supply of carbon dioxide.

FIG. 8 is a schematic diagram of a new apparatus and process for a self-refrigerating PFMS which provides two purified process fluids—a purified liquid $CO_2$ and a purified gaseous $CO_2$—both from a source of low pressure and low temperature supply of carbon dioxide. The advantages of using a low temperature supply is that relatively large quantities can be delivered at a lower cost to end users and the purity of the vapor phase $CO_2$ component derived from a low temperature supply (300 psi/0 F) has lower hydrocarbon and water vapor content. The present embodiment is specifically designed to deliver high quality liquid and gaseous carbon dioxide for TIG-Snow cleaning devices developed by the present inventor is described in detail in U.S. Pat. No. 5,725,154 and a pending patent application No. 60/189,075. However, the present embodiment may be used for more conventional $CO_2$ applications requiring both an inert dry gas and liquid carbon dioxide. The advantage of the present embodiment is that two pressure-temperature controlled and high quality process fluids are produced from a single tank of low temperature carbon dioxide. A compressor pump is used to fluidize a central equalization tank with liquid carbon dioxide, from which a liquid fraction and a gaseous fraction are withdrawn for downline TIG-Snow spray cleaning processes. During extraction of the gaseous carbon dioxide phase from said equalization tank, heat of vaporization energy is used simultaneously cool an incoming compressed purified fluid stream while heating an outgoing expanded purified gas stream used as a propellant gas. Referring to FIG. 8, the present embodiment comprises a source of low temperature carbon dioxide as indicated by the rectangular box (484). An example low-temperature supply is delivered as a 300 lb or 400 lb vacuum dewar (486) with a gas port which may be piped (488) directly into the exemplary PFMS as bounded by the rectangular box (490). Low temperature $CO_2$ vapor is withdrawn from the supply tank (486) and is fed into an inlet port (492) which is connected to a coalescing filter (494) to remove entrained contaminant aerosols, organic vapors and particles. Following coalescing treatment, the coalesced vapor is piped into a drying system (496), which may comprise silica gel, metal oxide or a membrane filter, to remove trace water vapor. Dry coalesced vapor is then piped to the inlet of a compressor pump (498) to-compress or fluidize the vapor from an inlet pressure and temperature of approximately 300 psi and 40 F to a fluidized pressure of approximately 900 psi and 120 F. Fluidized dry process fluid is then fed through an optional thermal catalytic unit (500) whereupon the temperature is raised to approximately 500 F to destroy trace hydrocarbons contained within the process fluid. Fluidized and/or catalytically treated process fluid exits the catalytic treatment unit and enters the inner tube of a tube-tube heat exchanger (502) and is compressed into an equalization tank (504). The equalization consists of, for example, a 450 liter to 20 liter high pressure and D.O.T. approved stainless steel sample cylinder having a threaded inlet port and threaded outlet port. During the initial charging of the equalization tank, a vortex cooling system as described in FIG. 3 (228) may be used with a first heat exchanger (not shown) to provide the heat exchange media required to fluidize the catalytically treated process fluid to a gas-saturated liquid phase pressure of between 750 psi and 950 psi and a temperature of between 60 F and 75 F. A low level optical sensor (506) and a high level optical sensor (508) are used to turn on and to turn off the compressor to maintain the desired volume of purified liquid within the equalization tank (504). Following complete filling of the equalization tank (504), and initial stabilization of pressure and temperature, clean vapor may be withdrawn from the equalization tank (504) through a propellant delivery pipe (510) which counterflows through the interior of the outer tube (512) of the heat exchanger (502). The heat of vaporization energy is transferred between the outgoing expanding liquid-vapor (514) and the incoming catalytically treated process fluid (516). The result is the simultaneous production of both a condensed purified liquid and a heated propellant gas. A vapor condensing bridge pipe (518) connects the top port (520) of the equalization tank (504) to the bottom port (522) of the equalization tank (504). Clean vapor withdrawn from the equalization tank through propellant pipe (510) may be pressure regulated and metered using an in-line pressure regulator (524) and metering valve (526). Also, heated catalytically treated vapor may be piped through a blending pipe (528), pressure regulator (530) and metering valve (532), and mixed with the cooler vapor withdrawn from the equalization tank (504). Thus, the dual gas stream regulation and metering manifolds serve as a temperature control system (534) for the equalization tank (504) by regulating the amount of heated gas introduced and removed from the system. Mixed gas exits the mixing manifold (534) in a mixed gas pipe (536) and enters an ultrafiltration membrane filter (538) to remove trace particulate matter from the purified and mixed gas stream. Pure liquid carbon dioxide contained within the equalization tank (504) is withdrawn from the bottom port (522) and filtered through an ultrafiltration membrane (540). Thus the exemplary PFMS (490) is a purification-refrigeration system with the removal of various types of contaminants shown within the rectangular box (542) and the production of two purified process fluids (544)—pure gaseous carbon dioxide (546) and pure liquid carbon dioxide (548). The "engine" that drives the purification-refrigeration process thus described is derived from a novel coaxial $CO_2$ spray cleaning technology, called Thermal-Inert-Gas-Snow or TIG-Snow spray cleaning, and previously developed and patented by the present inventor as stated above. As shown in FIG. 8, the TIG-Snow spray cleaning process utilizes a heated propellant gas stream (550) and a small quantity of solid carbon dioxide (552), derived from capillary condensation (554) of liquid carbon dioxide. The two process fluids are mixed in a convergent-divergent nozzle (556) and directed at a substrate (not shown).

Figure 8A:
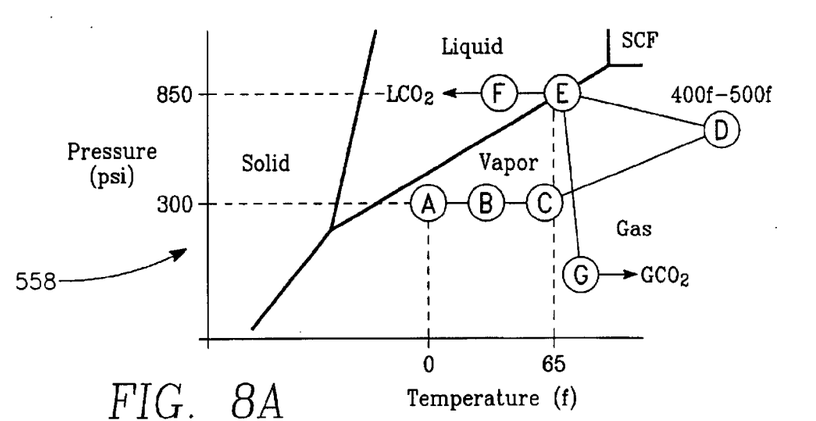
FIG. 8A is a phase diagram of a dense fluid used in the exemplary self-refrigerated dense fluid treatment system of FIG. 8.

As shown in the phase diagram (558) of FIG. 8A, the present embodiment is a continuous operation as follows: (A) distillation of low temperature carbon dioxide liquid into a carbon dioxide vapor, (B) coalescing entrained contaminants from a low temperature carbon dioxide vapor, (C) removing trace water vapor from a carbon dioxide gas, (D) catalytically destroying trace hydrocarbons contained within a dry carbon dioxide gas, and (E) fluidizing a dry catalytically-treated carbon dioxide to produce-a source of purified clean liquid and purified gaseous carbon dioxide. From this source of clean process fluids; (F) ultrafiltered clean liquid carbon dioxide and (G) an ultrafiltered and heated propellant gas are simultaneously produced and used to provide the refrigeration needed to continue the purification and delivery process.

Figure 9:
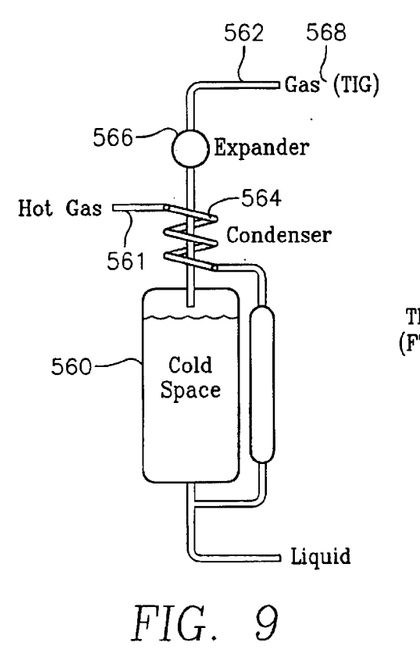
FIG. 9 is a schematic diagram showing the relationship between the flow rate of thermal inert gas (TIG) propellant and refrigeration rate of the exemplary process fluids management system of FIG. 8.
Figure 9A:
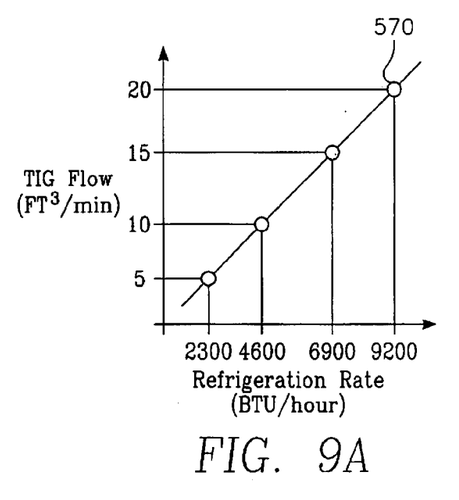
FIG. 9A is a graph relating TIG flow to refrigeration rate in the exemplary process fluids management system of FIG. 9.

FIGSS. 9 and 9A are a schematic diagram and growth showing the relationship between the flow rate of thermal inert gas (TIG) propellant and refrigeration rate of the exemplary process fluids management system of FIG. 8. The exemplary purification-refrigeration apparatus and process described in FIG. 8 produces both significant refrigeration and purification capacities. As shown in the figures, the amount of heat extracted from the equalization tank, the cold space (560), and removed from the incoming catalytically treated hot gas (561), and transferred into the TIG propellant gas (562) through the heat exchanger (564) and through the expansion valves (566), is directly proportional to the TIG (568) propellant gas withdrawn from the system. Based upon an average heat of vaporization value for liquid carbon dioxide of 70 BTU/lb at 60 F, refrigeration rates as high as 9,200 BTU/hour can be produced within the cold space based upon TIG usage rates of 20 scfm (570)—expanded vapor moved through the TIG-Snow cleaning process.

Although the invention has been disclosed in terms of preferred embodiments, it will be understood that numerous variations and modifications could be made thereto without departing from the scope of the invention as set forth herein.

I claim:

1. Carbon dioxide purification apparatus comprising:
   a vertically oriented cylindrical high-pressure equalization tank having an inlet;
   a vertically oriented cylindrical expander-concentrator tube disposed within the equalization tank, the expander-concentrator tube including upper and lower end sections having heat-exchanging surfaces interconnected with an enlarged expansion tube;
   a three way valve, a first connection pipe for fluidly connecting the bottom of the high-pressure equalization tank with the three way valve and a second connection pipe for fluidly connecting the lower end of the expander concentrator tube with the three way valve,
   a heat exchanger having an inlet side and an outlet side,
   a first vapor transfer pipe fluidly connecting the upper end of the expander-concentrator tube to the inlet side of the heat exchanger;
   a filter interposed in the first vapor transfer pipe between the expander-contractor tube and the heat exchanger;
   a compressor pump interposed in the first vapor transfer pipe between the filter and the heat exchanger;
   a condenser pipe fluidly connecting the outlet of the heat exchanger with the equalization tank;
   a second vapor transfer pipe for fluidly connecting the equalization tank to the inlet side of the heat exchanger.

* * * * *